United States Patent [19]

Giffune et al.

[11] Patent Number: 4,459,880

[45] Date of Patent: Jul. 17, 1984

[54] METHOD OF MAKING DIES

[75] Inventors: Joseph W. Giffune, Downers Grove; Francis N. Halicky, St. Charles; Edward J. Fijol, Dolton, all of Ill.

[73] Assignee: Jernberg Forgings Co., Chicago, Ill.

[21] Appl. No.: 414,864

[22] Filed: Sep. 3, 1982

[51] Int. Cl.³ .............................................. B21K 5/20
[52] U.S. Cl. ................................................. 76/107 R
[58] Field of Search ........................ 76/107 R, 101 R

[56] References Cited

U.S. PATENT DOCUMENTS

| | | |
|---|---|---|
| 2,318,445 | 5/1943 | Wintritz . |
| 2,352,141 | 6/1944 | Ulrich . |
| 2,422,325 | 6/1947 | Wheelon . |
| 2,495,107 | 1/1950 | Koenig . |
| 3,550,479 | 12/1970 | Pfaff, Jr. . |
| 3,930,425 | 1/1976 | Orlomoski . |

Primary Examiner—Roscoe V. Parker
Attorney, Agent, or Firm—Emrich, Lee, Brown & Hill

[57] ABSTRACT

A process for fabricating a cross rolling die is disclosed. A flat wooden cross roll tooling model blank cut to the specified die dimensions is milled by a conventional milling machine to produce a pre-form blank in accordance with the desired cross roll die surface. A face cast of the thus contoured wooden model blank, or a negative impression, is then made which, in turn, is used to make a positive cast of the wooden model blank. A series of closely spaced cuts parallel to the axis of roll is then made in the wooden model blank and the positive cast of sufficient depth to provide radial flexibility in each of these pieces. The model blank is then divided into segments for separate mounting on the cross roll die mounting plates, with each segment mounted separately so as to cover approximately 315° of the full 360° displacement of the cross rolling machine. The transverse cuts in the wooden model blank and positive cast are then filled with a hard-setting filler material and the surfaces of the model blank and positive cast are then contoured by grinding down. A sand cast is then made of each segment from which corresponding face casts are made. Abrader die casts are then in turn made of each face cast. A graphite electrode is then abraded on each abrader die and a cross roll die blank is then formed by means of electrical discharge machining (EDM) from which the cross roll die may be formed.

11 Claims, 19 Drawing Figures

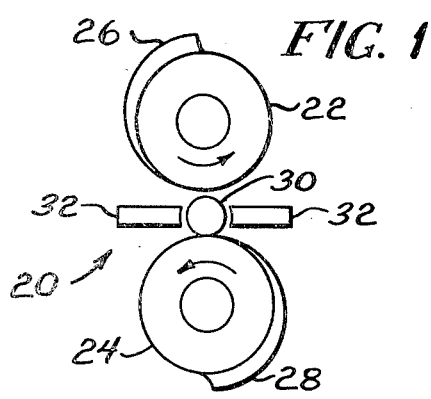
FIG. 1
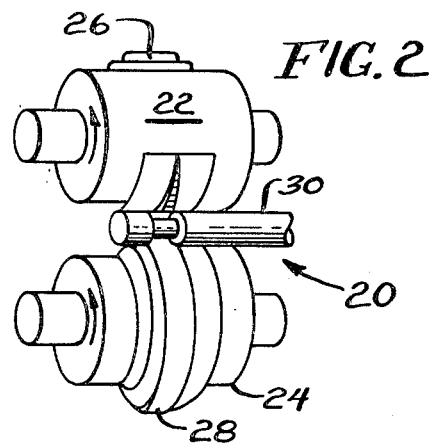
FIG. 2
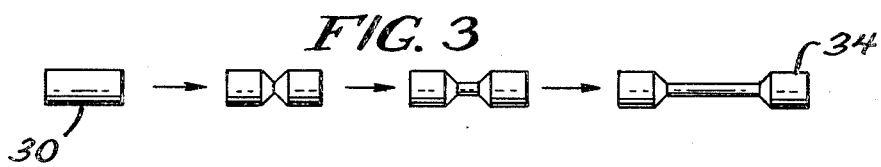
FIG. 3
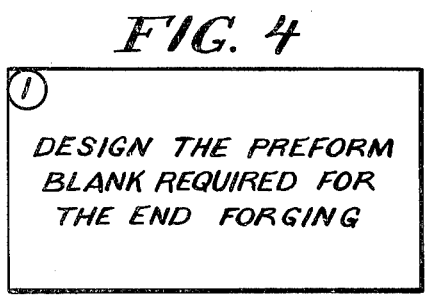
FIG. 4
① DESIGN THE PREFORM BLANK REQUIRED FOR THE END FORGING
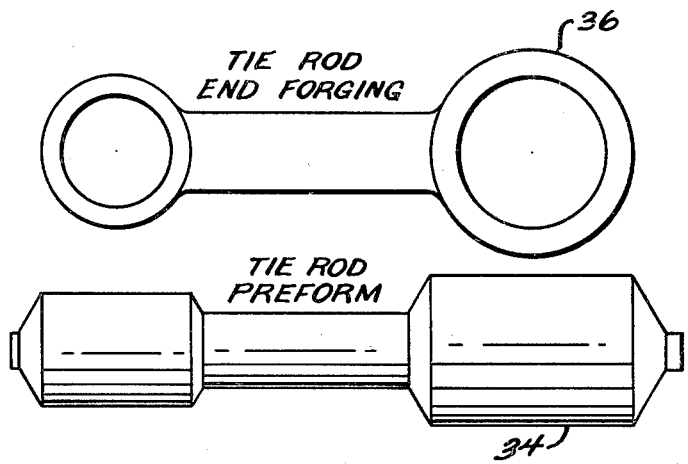
TIE ROD END FORGING
TIE ROD PREFORM
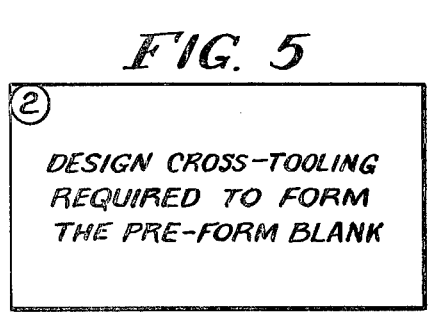
FIG. 5
② DESIGN CROSS-TOOLING REQUIRED TO FORM THE PRE-FORM BLANK
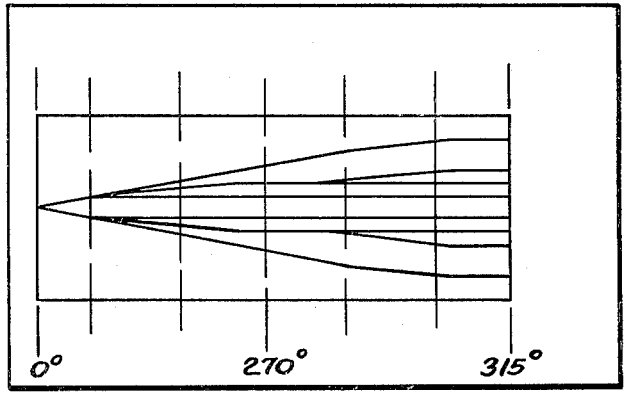

FIG. 6

③ PREPARE A CROSSROLL TOOLING MODEL BLANK

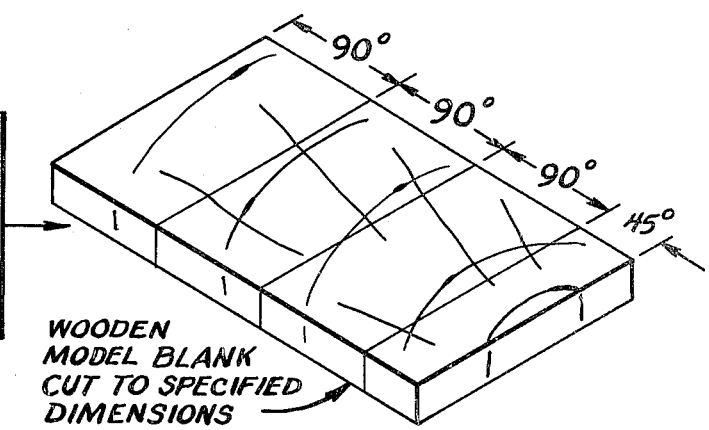

WOODEN MODEL BLANK CUT TO SPECIFIED DIMENSIONS

FIG. 7

④ INSTALL MODEL BLANK IN THE MILLING FIXTURE

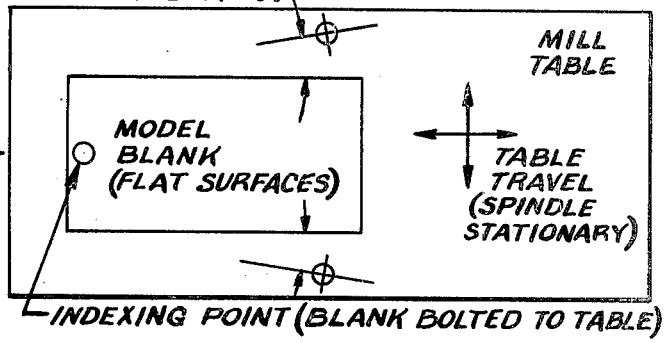

INDEXING POINT (BLANK BOLTED TO TABLE)

FIG. 8

⑤ MILL THE CROSSROLL TOOLING CONTOUR INTO MODEL BLANK

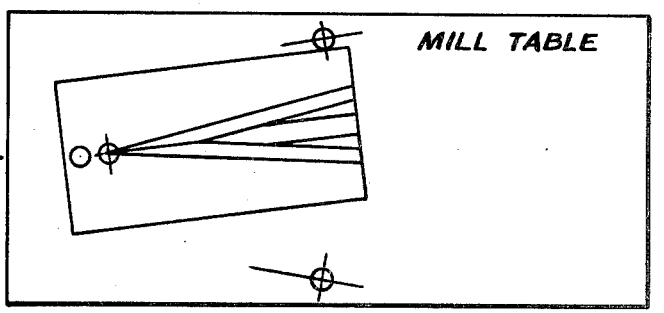

AFTER BLANK IS POSITIONED AT DESIRED ANGLE, NORMAL MILLING IS PERFORMED USING A FORM CUTTER.

FIG. 9

⑥ MAKE FACE CAST OF CONTOURED MODEL BLANK (NEGATIVE IMPRESSION)

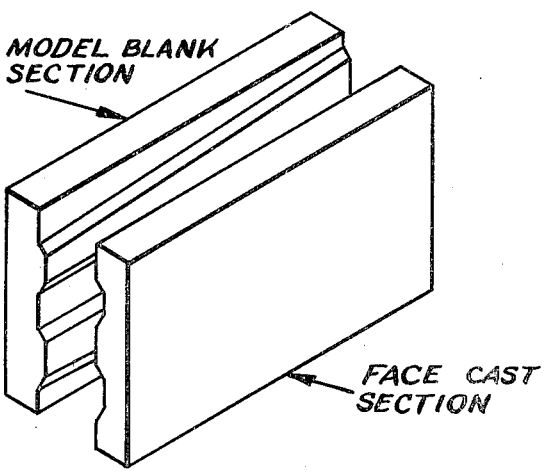

⑦ MAKE POSITIVE CAST OF FACE CAST

⑧ CUT THE MODEL BLANK AND THE POSITIVE CAST PARALLEL TO AXIS OF ROLL SUFFICIENTLY TO DEVELOP RADIAL FLEXIBILITY

⑨ DIVIDE MODEL BLANK AND POSITIVE CAST INTO APPROPRIATE SEGMENTS

⑩ MOUNT MODEL BLANK AND POSITIVE CAST TO THE CROSSROLL DIE MOUNTING PLATES (EACH MOUNTED SEPARATELY)

CROSSROLL DIE MOUNTING PLATE

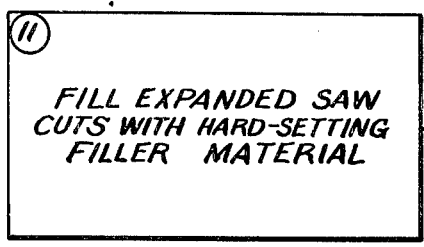 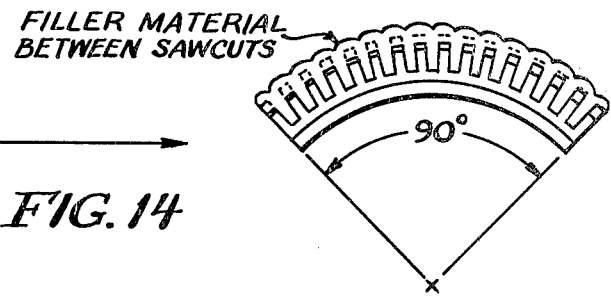
FIG. 14
FIG. 15
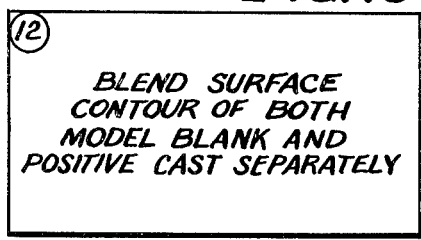 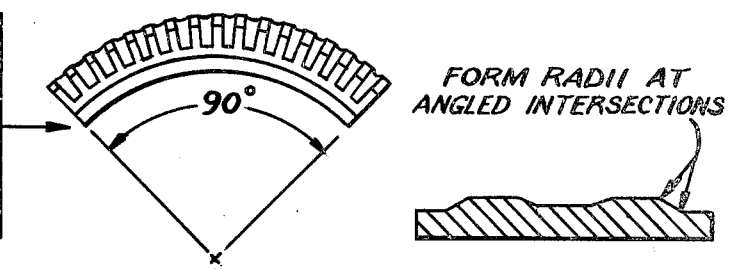
FIG. 16
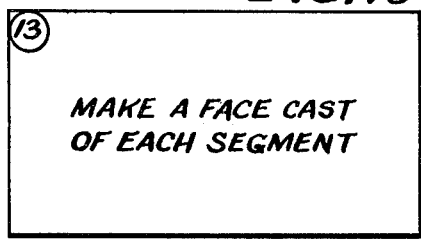 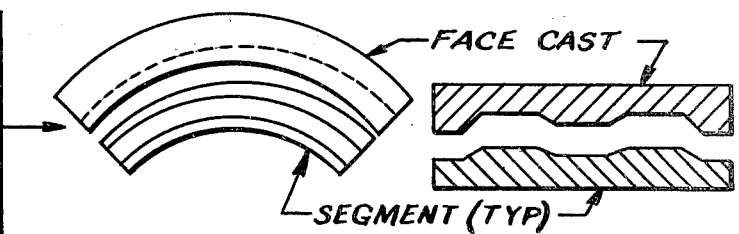

METHOD OF MAKING DIES

BACKGROUND OF THE INVENTION

This invention relates generally to roll-type forging machines and more particularly is directed to a method for fabricating roll dies for use in cross rolling machines.

In conventional die forging of a part, a series of dies is employed to successively shape the part from the billet, blank or stock piece to the finished product. Each die is formed with a cavity, the cavities so progressively differing in shape in the successively used dies that the original billet when heated is, by a series of press strokes or stamping action applied thereto, brought to the desired shape.

An improvement useful in some applications to the basic die forging process just described involves the use of cylindrical die rolls to form a series of varying cross sections along a bar or billet of material. Forgings with tapers, steps, shoulders or any other surface of revolution can be formed accurately and efficiently by this cross rolling process. Preheated metal bars or billets are manually or automatically fed between two rolls parallel to their axes with the two rolls rotating in the same direction. One revolution of the machine rolls produces a finished part with provision frequently made for simultaneously rolling two or more pieces in an end to end orientation. The advantages of this forging process include: reduced scrap loss; fast, quiet and accurate billet shaping; and stock diameter reductions by as much as 2:1 in one pass.

In spite of the aforementioned advantages of the cross rolling process, this approach has a shortcoming. This shortcoming relates to the great expense generally involved with the design and fabrication of the cylindrical die forms used in these machines. The design of these die forms is determined by the final shape into which the billet is to be worked. The prior art approach has been to fabricate a test die out of an easily machined material in order to prove out the design of the cylindrical dies. The sample is then shaped generally by a 5-axis, computer controlled milling machine. Not only is this sophisticated, numerally controlled machine very expensive, but the computer programming required for its operation also makes this approach impractical for many forging applications. In addition to the high costs and extensive time inherent in this approach, restrictions in the hardness of materials used also limit its practical utility. Thus, the inherent advantages of this forging technology have not to date generally been available as an industrial tool on a widespread basis.

The present invention is intended to overcome the aforementioned limitations in the fabrication of cross roll dies. By substantially simplifying and reducing the cost of fabricating the cylindrical dies utilized in a cross rolling machine, this forging approach is now available for use in many more areas of technology in a larger variety of applications.

OBJECTS AND SUMMARY OF THE INVENTION

Therefore, in view of the above, it is an object of the present invention to provide an improved method for fabricating cross rolling dies.

It is another object of the present invention to substantially simplify and reduce the cost of fabricating the wedge-shaped, cylindrical forming dies used in a conventional cross rolling machine.

The present invention contemplates the fabrication of a cross rolling die which eliminates much of the complexity and expense heretofore encountered in such a process. A flat, blank model which is comprised of a conventional, easily worked material such as wood is machined to the appropriate length and contoured according to the desired shape of the cross roll die. A face cast of the thus contoured wooden model blank, or a negative impression thereof, is then made which, in turn, is used to make a positive cast of the pre-formed blank. Flexibility is then incorporated in the pre-form model blank and the positive cast thereof by subjecting each to a closely spaced series of parallel cuts extending nearly the entire depth of each element and oriented parallel to the axis of roll of the die when installed in the cross rolling machine. The model blank and the positive cast are then divided into appropriate segments spanning 315° of the circumference of the cross rolling machine. The pre-form model blank and positive cast are then separately positioned on the mounting plates of the cross rolling machine and the cross cuts in each, which have been thus expanded by the curvature of the installation, are then filled with a hard-setting filler material and the thus blended surfaces of the model blank and positive cast are subjected to a grinding process for blending the surface contour of both elements to the desired shape.

The pre-form wooden blank and the positive cast thus formed may be cooperatively used to test the design of the proposed cross rolling die. By subjecting an easily formed material, such as any of the more conventional plastics, to the cross rolling process using the positive cast, the shape into which the original billet will be formed may be determined. By comparing the thus cross rolled shape of the malleable die shape with the desired die shape, the configuration of the model blank contour may be evaluated. If a change is required, it may be easily incorporated in the pre-form wooden blank and in another positive cast by means of a negative impression thereof, and tested again in the actual environment of the cross rolling machine. This method substantially simplifies and reduces the cost of designing, fabricating and manufacturing a cross rolling machine die.

Following verification of the cross roll die design, a sand cast is then made of each segment of the positive cast from which corresponding face casts are made. Abrader die casts are then in turn made of each face cast. A graphite electrode is then abraded on each abrader die and a cross roll die blank is then formed by means of electrical discharge machining (EDM) for subsequent fabrication of the cross roll die.

BRIEF DESCRIPTION OF THE DRAWINGS

The appended claims set forth those novel features believed characteristic of the invention. However, the invention itself, as well as further objects and advantages thereof will best be understood by reference to the following detailed description of a preferred embodiment taken in conjunction with the accompanying drawings, in which:

FIG. 1 is a side elevational view of a cross rolling machine wherein is shown the position of the billet being shaped between the cross rolling dies;

FIG. 2 is a perspective view of the cross rolling machine of FIG. 1;

FIG. 3 illustrates the progressive shaping of a billet or stock piece to the finished product carried out by a cross rolling machine such as shown in FIG. 1; and FIGS. 4 through 19 represent a diagrammatic illustration of the process of forming a cross rolling die in accordance with the present invention.

DETAILED DESCRIPTION OF THE PREFERRED EMBODIMENT

Figure 10:
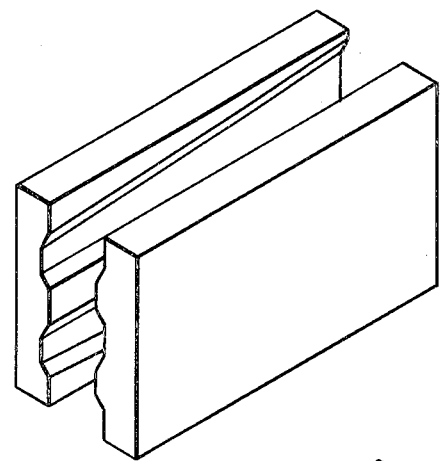

Referring to FIGS. 1 and 2, there is shown the general configuration of a cross rolling machine 20 for producing a forging with tapers, steps, shoulders, or any other surface of revolution. The cross rolling machine 20 generally includes two adjacent rolls 22, 24 positioned in relatively close proximity to one another and having parallel axes of revolution. As shown by the arrows in FIG. 1, rolls 22, 24 are rotated in the same direction with a billet or stock piece 30 positioned therebetween and maintained in such position by means of a pair of spaced guide boards 32. The preheated metal bar or billet 30 is automatically fed between the two rolls 22, 24 (parallel to their axes). Mounted on the rolls are wedge-shaped forming dies 26, 28 which are generally cylindrical in cross-sectional shape and which progressively squeeze the bar or billet 30 during the rotation thereof. One revolution of the machine rolls 22, 24 produces a finished part which is progressively shaped from a generally cylindrical form to a piece having the desired contoured surface as shown in FIG. 3.

As shown in FIGS. 1 and 2, the wedge-shaped dies 26, 28 are mounted on respective rolls 22, 24 perpendicular to the axis of the fed billet and start into the work piece 30 with a "plowing" action when the billet is positioned therein and the rolls begin rotating. The billet is squeezed, in forming a progressively elongated piece along its center line providing a grain flow that follows the profile of the finished part as shown in proceeding from left to right in FIG. 3. The finished part is dropped into a gutter (not shown) provided near the end of roll rotation, and is then discharged forward automatically when the roll starts to rotate to form the next billet. The present invention is directed toward an improved method for fabricating the dies 26, 28 utilized in the cross rolling machine 20 as described in the following paragraphs.

FIGS. 4 through 19 describe a process for fabricating cross rolling dies as contemplated by the present invention. The process is comprised of a series of steps shown in the accompanying drawings in sequentially proceeding from FIG. 4 to FIG. 19. Each of these steps are described in detail below.

FIG. 4 illustrates a typical use of the present invention in generating a preform blank for a tie rod. The cross rolling machine 20 of FIGS. 1 and 2 is utilized to form the selectively shaped and contoured preform for a tie rod, or any other end product configuration desired. Once the tie rod preform has been forged by the cross rolling machine, and discharged therefrom, it is then subjected to an end forging process wherein the tie rod end product 36 is formed from the preform 34 thereof.

The second step in the present invention is shown in FIG. 5. This step involves designing the cross-tooling required to form the preform blank of the desired shape. Arriving at the milled design of the preform blank is basically a mathematical process wherein a given set of equations must be satisfied for a particular material and the specific shape of the end product desired. An example of some parameters which enter into these calculations are the severity of deformation and the deformation rate of the worked material and its limits. This theoretical process provides the die designer with a wedge angle and a forming angle of the die to be used in the cross rolling machine.

The next step, as shown in FIG. 6, is the preparation of a flat cross roll tooling model blank preferably comprised of wood. This model blank is cut to the specified dimensions of the cross rolling die in terms of its width, length and the required depth thereof. In step 4, as shown in FIG. 7, this wooden model blank is then pivotally positioned in a vertical mill so as to be freely rotated around an indexing point through which the wooden blank is bolted to the table of the vertical mill. Lateral stops corresponding to the limits of the wedge angle are then positioned on the vertical mill's table for proper cutting angle adjustment.

As shown in FIG. 8, the wooden model blank is then milled in accordance with the cross roll tooling contour as provided by the earlier generated design required to form the preform blank from which the end forging is derived. After the model blank is positioned at the desired angle on the mill table, normal milling is performed thereupon using a form cutter in a conventional manner.

The next step in the process of the present invention, as shown in FIG. 9, involves the fabrication of a face cast, or negative impression, of the contoured model blank which has been milled according to the theoretical optimum shape of the cross rolling die. The next step, as shown in FIG. 10, is the making of a negative impression of the face cast which represents a positive cast of the contoured model blank. This provides two identically contoured models of the desired cross rolling die. While the cross roll tooling model blank is preferably comprised of a material such as wood, the positive cast is preferably comprised of a clay-like material for producing a hardened model of the cross roll die.

Figure 11:
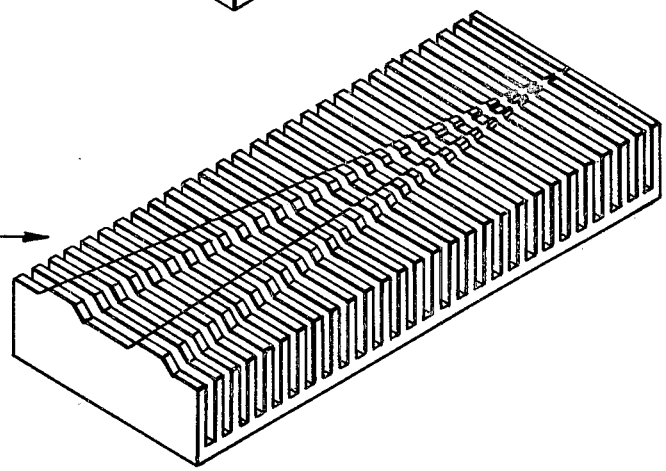
Figure 12:
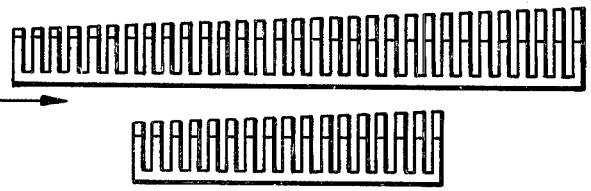

As shown in FIG. 11, the next step of the process involves cutting the model blank and the positive cast thereof into a series of parallel, linear serrations which are oriented parallel to the axis of rotation of the rolls of the cross rolling machine. These cuts are made in the model blank and the positive cast to such a depth as to provide radial flexibility in each of these elements. Radial flexibility can generally be provided in these models by serrating them to a depth of approximately within 1/16 of an inch of the opposite face of the model. As shown in FIG. 12, the model blank and the positive cast are then divided into appropriate segments for spanning the 315° subtended arc covered by the wedge-shaped dies positioned on the rolls of the cross rolling machine. In a preferred embodiment, the model blank and the positive cast are divided into three sections, each spanning 90°, with the fourth section subtending an arc of 45°.

Figure 13:
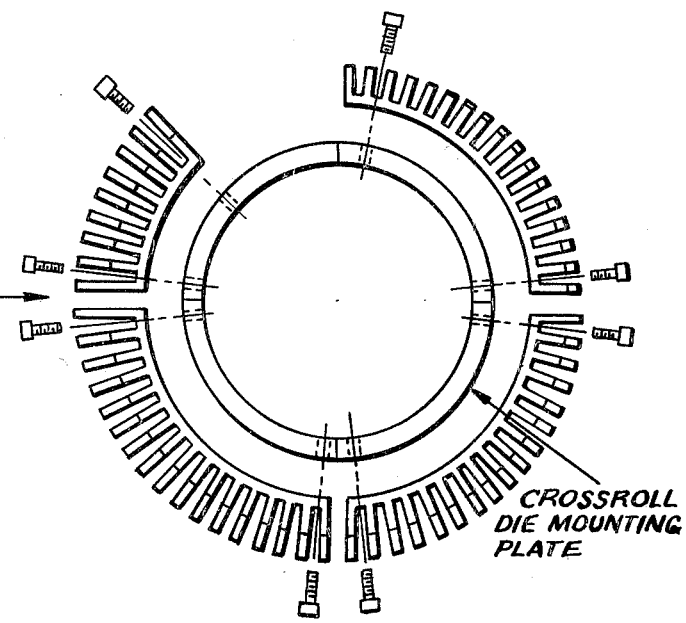

The next step, as shown in FIG. 13, involves the mounting of the model blank and the positive cast to the cross roll die mounting plates on the rolls 22, 24 of the cross rolling machine 20. This mounting is done in a conventional manner such as by utilizing a plurality of bolts threadably coupled to the mounting plate of a respective roll. The model blank and the positive cast are mounted separately thereon and securely fastened thereto. The next step, as shown in FIG. 14, involves the filling of the saw cuts which have been expanded by the bending action in positioning them on a cross roll die mounting plate with a hard-setting filler material. As shown in FIG. 15, the thus filled curved peripheries of the model blank and the positive cast are shaped so as to eliminate irregulaties thereon in providing a smoothly contoured surface in which the hard-setting filler material is smoothly blended with the wood and clay of the model blank and positive cast, respectively.

The design incorporated in the model blank and positive cast may then be tested by inserting a work piece comprised of a malleable material in the cross rolling machine with the model blank and positive cast positioned on the mounting plates of the machine's rolls. By comparing the configuration of the thus shaped malleable material with the desired end forging shape, the die design may be either verified or subjected to modification and subsequent verification. Modifications to the configurations of the model blank and the positive cast may be easily made and quickly verified. This may all be accomplished without the time-consuming and expensive steps required in working a hard, tough die steel in arriving at the desired die shape. Thus, by virtue of the present invention the steps required in fabricating a die for a cross rolling machine are substantially simplified and shortened resulting in a reduction in cost while still allowing for the use of hard, tough die steels.

Figure 17:
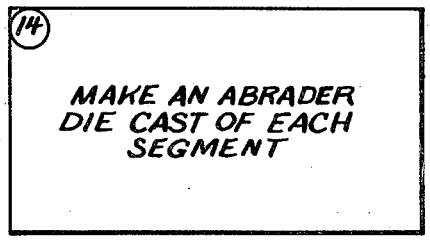
Figure 18:
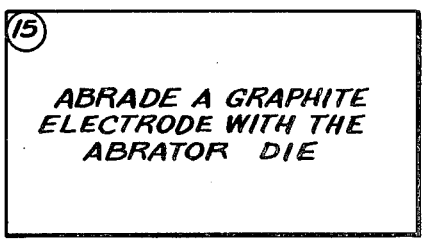

The next step, as shown in FIG. 16, involves making a face cast of each segment. From the negative face casts an abrader die cast of each segment is formed, as shown in FIG. 17. A graphite electrode is then abraded by means of these abrader dies formed in the shape of respective segments of the model blank, as shown in FIG. 18. The graphite electrode is then used to burn a cross roll die blank by means of electrical discharge machining (EDM). These latter steps involving EDM in the fabrication of a die blank are conventional in nature and will not be further described herein.

Figure 19:
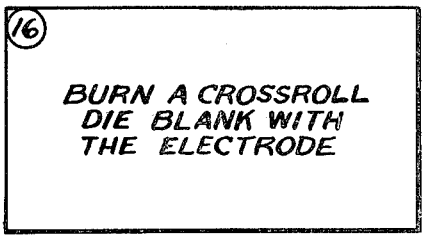

The die blank thus formed in step 16 as indicated in FIG. 19 will thus provide a cross roll die of verified design parameters which may be utilized in a cross rolling machine without further testing, reworking or verification.

While particular embodiments of the present invention have been shown and described, it will be apparent to those skilled in the art that changes and modifications may be made therein without departing from the invention in its broader aspects. The aim of the appended claims, therefore, is to cover all such changes and modifications as fall within the true spirit and scope of the invention.

We claim:

1. A method for making a roll die having a generally cylindrical cross-section for forming a work piece into a desired configuration on a forging machine, said method comprising the steps of:

forming a flat model blank of said die cut to the dimensions of said die and having a surface milled in accordance with design parameters required to form said work piece into said desired configuration;

making a positive cast of said flat model blank having a contoured surface thereon identical to the milled surface of said flat model blank;

making a plurality of parallel, linear cuts in the milled surface of said flat model blank and the contoured surface of said positive cast parallel to the axis of roll of said die, wherein the depth of said cuts provides radial flexibility in said model blank and in the positive cast thereof;

separately mounting said model blank and said positive cast on said forging machine and filling the plurality of cuts of said model blank and said positive cast with a hard-setting filler material when thus mounted whereby the surfaces of said model blank and said positive cast assume a generally cylindrical cross-sectional shape conforming with the design parameters of said roll die;

verifying the design of said model blank by shaping a malleable work piece with said positive cast on said forging machine, comparing the configuration of the thus formed work piece with the desired configuration, and modifying the surfaces of said model blank and said positive cast as required to provide the desired work piece configuration; and making an abrader die cast from said positive cast following verification of the design of said model blank and forming a roll blank die by means of electrical discharge machining using said abrader die cast.

2. The method of claim 1 wherein said flat model blank is comprised of wood.

3. The method of claim 1 wherein said hard-setting filler material is epoxy.

4. The method of claim 1 further including the step of planing the thus-filled surfaces of said model blank and said positive cast in smoothing the composite surfaces thereof.

5. The method of claim 1 further comprising the step of making a negative impression of the contoured surface of said model blank in the form of a face cast from which the positive cast of said model blank is made.

6. The method of claim 1 wherein said forging machine is a cross rolling machine and said model blank and said positive cast are divided into a plurality of individual segments prior to the mounting thereof on said cross rolling machine.

7. The method of claim 6 wherein said model blank and said positive cast are each divided into four segments subtending an arc of approximately 315° when mounted on said cross rolling machine.

8. The method of claim 1 wherein said abrader die cast is comprised of silicon carbide.

9. The method of claim 1 wherein said positive cast is comprised of a clay-like material.

10. The method of claim 1 wherein the step of forming said flat model blank in accordance with said design parameters is accomplished by means of a computerized numerically controlled vertical milling machine.

11. A method for making a roll die having a generally cylindrical cross-section and a wedge-shaped surface for forming a work piece into a desired configuration on a cross rolling machine, said method comprising the steps of:

determining the design parameters including wedge and forming angles of said die required to form a work piece into said desired configuration;

forming a flat wooden model blank of said die cut to the dimensions of said die and milled in accordance with the design parameters of said die so as to provide a contoured surface thereon;

making a negative impression of the thus contoured surface of said wooden model blank in the form of a face cast;

making a positive cast of said face cast, said positive cast having a contoured surface thereon identical to that of said wooden model blank;

making a plurality of parallel, linear cuts in said wooden model blank and said positive cast parallel to the axis of roll of said die, wherein the depth of said cuts provides radial flexibility in said wooden model blank and said positive cast;

separately mounting said wooden model blank and said positive cast on said cross rolling machine;

filling the plurality of cuts in said wooden model blank and said positive cast when mounted on said cross rolling machine with a hard-setting filler material whereby the surface of said wooden model blank and said positive cast assume a generally cylindrical cross-sectional shape with a wedge-shaped surface conforming with the design parameters of said die thereon;

planing the wedge-shaped surfaces of said wooden model blank and said positive cast in smoothing the composite surfaces thereof;

verifying the design of said wooden model blank by cross rolling a malleable work piece with said positive cast on said cross rolling machine, comparing the configuration of the thus formed work piece with the desired configuration, and modifying the surface of said wooden model blank as required to provide the desired work piece configuration;

making a face cast of said positive cast following verification of the design of said die;

making an abrader die cast of said face cast;

abrading a graphite electrode with said abrader die cast; and forming a cross roll die blank with said graphite electrode by means of electrical discharge machining.

* * * * *